United States Patent

[11] 3,549,877

[72] Inventor David A. Goldman
 Westchester County, N.Y. (Croton Heights Road, Box 69-RFD 1, Yorktown Heights, N.Y. 10598)
[21] Appl. No. 756,003
[22] Filed Aug. 28, 1968
[45] Patented Dec. 22, 1970

[54] UNILATERAL MOMENT PROBABILITY COMPUTER
 14 Claims, 6 Drawing Figs.
[52] U.S. Cl............................................... 235/193, 235/151.13
[51] Int. Cl............................................... G06g 7/48
[50] Field of Search.................................. 235/193, 184, 194, 195, 196, 151.1, 151.11, 151.12, 151.2, 151.21, 151.22, 151.3, 151.31, 151.32, 151.33, 151.34, 151.35, 183

[56] References Cited
 UNITED STATES PATENTS
 2,965,300 12/1960 Radley et al................ 235/193

| | | | |
|---|---|---|---|
| 3,082,949 | 3/1963 | Barker............................ | 235/193X |
| 3,146,344 | 8/1964 | Palmer........................... | 235/151.13 |
| 3,147,370 | 9/1964 | Lowman......................... | 235/151.13 |
| 3,339,063 | 8/1967 | Norsworthy.................... | 235/193X |

Primary Examiner—Malcolm A. Morrison
Assistant Examiner—Joseph F. Ruggiero
Attorney—Watson, Leavenworth & Kelton ABSTRACT: A computer for determining a bound to the probability of a random variable equaling or exceeding a prescribed limit value in accordance with applicant's novel method of probability analysis. The computer includes circuitry for averaging the variable, circuitry for determining a selected unilateral moment of the variable above its average value, circuitry for determining the positive difference between the limit value and the averaged value of the variable and for raising the difference to a numerical power corresponding to the selected moment, and circuitry for determining the ratio of the unilateral moment to the raised difference. The computer is illustrated in applications involving air pollution monitoring and control and manufacturing process control.

UNILATERAL MOMENT PROBABILITY COMPUTER

BACKGROUND OF THE INVENTION

This invention relates to apparatus for performing probability analysis of a random variable. In particular, the invention relates to a probability computer adapted to determine a bound to the probability of a random variable equaling or exceeding a prescribed limit value.

In known methods of probability computation the second bilateral moment or variance is generally of significant interest, the square root of this moment being known as the standard deviation. In computing the second moment, the instantaneous variable values above and below the expectation or mean value of the variable are raised to the second power and a summation is made. For the higher moments, correspondingly higher powers are employed.

The use of the bilateral second moment to determine a bound to the probability of whether a variable will equal or exceed a given amount from the expectation has been disclosed in what is known as Chebyshev's inequality, a mathematical inequality in which a bound to the probability of a variable equaling or exceeding a given amount from the expectation is expressed as a function of the standard deviation of the variable. A probability computer based on the Chebyshev inequality is the subject of applicant's copending application Ser. No. 756,002, filed on Aug. 28, 1968 and entitled "Bilateral Moment Probability Computer."

While probability determination based on bilateral second moment or variance computation is of considerable value, it provides inherently a somewhat broader probability bound than can be obtained since moments above and below the mean are employed conjunctively. For instance, if the probability of a given variable equaling or exceeding a limit level above the expectation is alone of interest, the cognizance in the method of the moments below the mean serves to broaden the determined probability bound. Similarly, the second bilateral moment method provides broader bounds to the probability in taking moments above the mean into account when a limit level below the expectation is of interest.

SUMMARY OF THE INVENTION

In the present invention, applicant has evolved a new method of probability bound determination and has provided a novel computer implementing same.

In particular, applicant has found that unilateral moments are of unique value in providing tighter probability bounds to the probability of a random variable equaling or exceeding limit values above and below the expectation of the variable. Applicant has determined further that a unilateral moment probability computer may be implemented with significant simplification over that required in a second bilateral moment computer. In addition applicant has determined that probability bounds based on different unilateral moments can be computed simultaneously and that the tightest probability bound may be selected therefrom automatically.

In the present invention there is provided a probability computer which operates in response to input signals representing a random variable and an upper limit value to generate an output signal indicating a bound to the probability of the variable equaling or exceeding the limit value.

The invention is further embodied in a probability computer which operates in response to input signals representing a random variable and both upper and lower limit values to generate two output signals indicating bounds to the probabilities of the variable either equaling or exceeding the upper limit or equaling or falling below the lower limit.

The probability computer of the invention is shown herein in system applications, including air pollution monitoring or control and manufacturing process control. Such systems, which normally involve only direct monitoring of the variable itself are enhanced considerably by the probability information provided by the computer of the invention.

It is a primary object of the invention to provide a probability computer which provides a bound to the probability of a variable equaling or exceeding a prescribed limit value based on unilateral moments of the variable above its expectation.

It is another object of this invention to provide a probability computer in which cognizance is taken separately of the unilateral moments of a random variable both above and below the expectation of the variable to provide multiple probability bounds.

It is a further object of this invention to provide a system for indicating the approach of excess atmospheric pollution levels.

It is an additional object of this invention to provide a system for enabling the operation of manufacturing and process control systems at the permissible outer limits of operation.

These and other objects of the invention will become evident from a consideration of the following detailed description of the preferred embodiments of the invention and the drawings in which like numbers are used to identify like parts throughout.

DESCRIPTION OF THE PREFERRED EMBODIMENTS

An understanding of the several versions of the probability computer of the invention will be greatly enhanced by a consideration of the novel method of probability analysis evolved by applicant.

Figure 1:
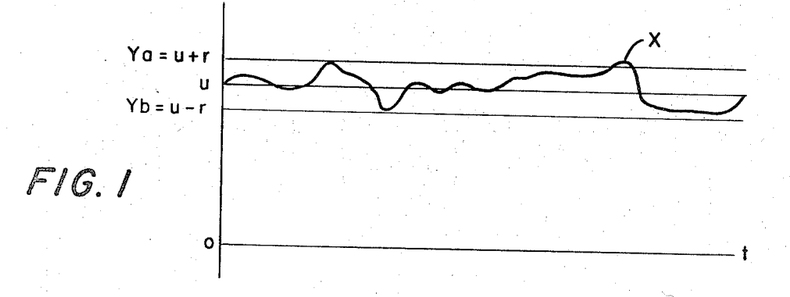
FIG. 1 is a plot of a real time random variable and limits imposed thereon in probability computation.

In FIG. 1 a real time variable X is shown as having an expectation or mean value $u$. The unilateral moments, $M_k a$, of the variable above the expectation are defined as follows:

$$M_k a = \int_u^\infty (x-u)^k f_x(x) dx \qquad (1)$$

where $f_x(x)$ is the probability density function of the random variable $X$ and $k$ is a positive real number.

It will be observed that a level $Y_a = (u + r)$ lies between $u$ and infinity.

$$M_k a = \int_u^{u+r} (x-u)^k f_x(x) dx + \int_{u+r}^\infty (x-u)^k f_x(x) dx \qquad (2)$$

where $r$ is positive.

Since $M_k 2$ is the sum of both integrals, it is of necessity at all times equal to or greater than either. Thus, $$M_k a \geq \int_{u+r}^\infty (x-u)^k f_x(x) dx \qquad (3)$$

Between the limits of $u+r$ and infinity, $x \geq (u+r)$, or $(u+r) \leq x$, and thus $r \leq x-u$.

The inequality (3) may be then expressed as $$M_k a \geq \int_{u+r}^{\infty} r^k f_x(x) dx \qquad (4)$$

or, since $r$ is a constant, as $$M_k a \geq r^k \int_{u+r}^{\infty} f_x(x) dx \qquad (5)$$

The probability of X being equal to or greater than the deviation level $u+r$ is by definition $$P[X \geq (u+r)] = \int_{u+r}^{\infty} f_x(x) dx \qquad (6)$$

Substituting (6) in (5), the unilateral moments of the variable above the expectation may be expressed by the inequality $$M_k a \geq r^k P[X \geq (u+r)] \qquad (7)$$

The probability in (6) may be further expressed as $$P[X \geq (u+r)] \leq \frac{M_k a}{r^k} \qquad (8)$$

Since $u+r = Y_a$, and $r = Y_a - u$, the inequality (8) becomes $$P[X \geq Y_a] \leq \frac{M_k a}{(Y_a - u)^k} = P_a \qquad (9)$$

Literally stated, the bound to the probability $P_a$ of the random variable X equaling or exceeding in value the limit value $Y_a$ is less than or equal to the ratio of a unilateral moment $M_k a$ of the variable above its expectation $u$ to the difference, between the limit value and the mean, raised to a power equal to the unilateral moment employed.

Where the departures of the variable below the mean are of interest, the above derivation can be repeated to yield the following inequality $$P[X \leq Y_b] \leq \frac{M_k b}{(u - Y_b)^k} = P_b \qquad (10)$$

Where $M_k b$ represents the unilateral moments of the variable below the mean and $Y_b$ represents a limit value equal to $u-r$.

Figure 2:
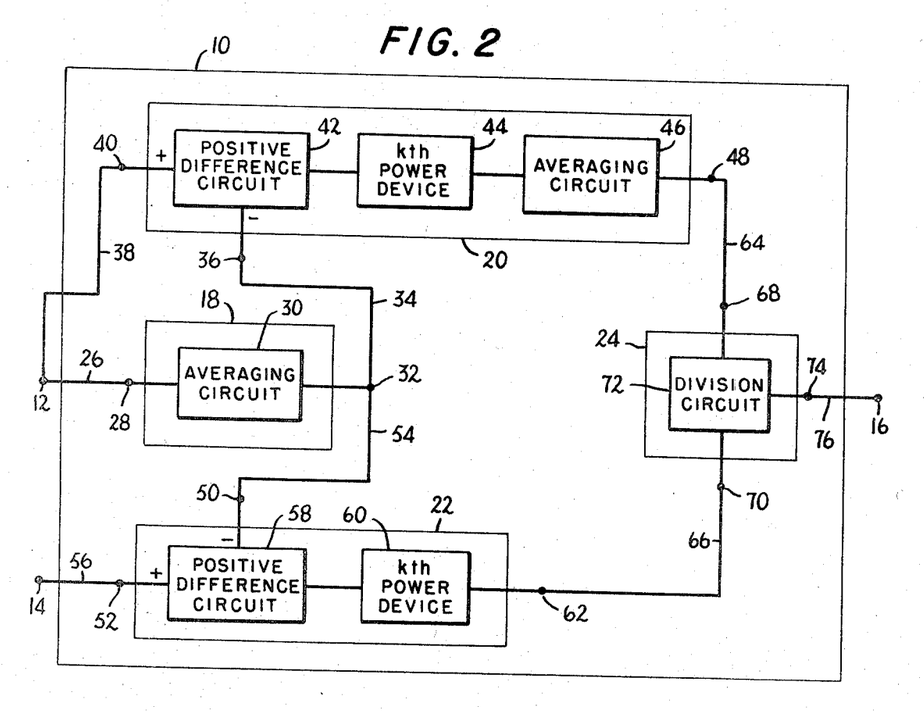
FIG. 2 is a block diagram of a probability computer adapted to provide a bound to the probability of a random variable equaling or exceeding an upper limit value based on a selected unilateral moment of the variable above its expectation.

This method of probability determination is implemented in the computer 10 shown in FIG. 2. This computer is adapted to provide the probability bound $P_a$, based on computation of unilateral moments above the expectation of the random variable. At input terminals 12 and 14 the computer receives input signals representing respectively the random variable X which it is desired to maintain below a prescribed limit and the prescribed limit $Y_a$. At output terminal 16 the computer provides the signal representing $P_a$.

The computer is functionally divisible into several separate computing elements. Element 18 is adapted to determine the expectation $u$ of the random variable X. Computing element 20 is adapted to determine from the random variable and the expectation the unilateral moments $M_k a$, of the variable above the expectation. Element 22 is adapted to compute the denominator in the probability expression (9) above. Element 24 is adapted to compute $P_a$ based upon input information from elements 20 and 22. It will be evident presently that the function and interconnection of these various computing elements meets that required in the preceding theoretical analysis.

The random variable signal $x$ is conducted from computer input terminal 12 over line 26 to input terminal 28 of computing element 18. The signal is applied to averaging circuit 30 of element 18. The averaging circuit performs a summation of the applied signal over a given time period to provide an output signal representing the expectation of the applied signal. Circuit 30 may be any conventional form of averaging circuit, such as a low-pass filter or an operational amplifier with capacitive-resistive feedback. The output signal is coupled to output terminal 32 of element 18 and from this point over line 34 to input terminal 36 of computing element 20. The random variable signal is also conducted from terminal 12 over line 38 to input terminal 40 of computing element 20. These signals representing the variable and its mean, are applied to positive difference circuit 42. This circuit is operative to subtract the expectation from the variable and to yield output signals representing only instantaneous departures of the random variable above the expectation. These positive difference signals are conducted to $k$th power device 44.

The $k$th power device 44 is adapted to provide output signals constituting powers of input signals. The particular power involved in device 44 in any given probability determination is that corresponding to the moment desired as the basis for the determination. For example, if it is desired to employ only the second power, the $k$th power device is a second power device or simple squaring circuit. On the other hand, if it is desired to investigate the probability computations resulting from each of the $k$ moments of the variable, a variable $k$th power device is used, the device being successively set to increasing integral powers for computation of the plurality of probability determinations. For this purpose, suitable exponential curves for the respective powers may be generated in device 44 by diode shaping means.

The output of $k$th power device 44 is applied to averaging circuit 46. This circuit, like circuit 30 above, is operative to provide averaging of the applied signal over a selected period of time. This averaged signal is fed to output terminal 48 of element 20. The relationship of the circuitry just described to the theoretical computation of $M_k a$ will be evident from a consideration of expression (1) above. It will be clear that element 20 constitutes means for computing the unilateral moments of the variable above its mean as required in expression (9) above.

Computing element 22 has input terminals 50 and 52 to which are applied respectively the expectation $u$ over line 54 and the limit value $Y_a$ over line 56. These signals are applied to positive difference circuit 58. This circuit is operative to subtract the expectation from the limit value to yield output signals representing only instantaneous positive differences between the limit value and the expectation. These positive difference signals are conducted to $k$th power device 60. As in the case of the above-described device 44, device 60 yields as its output signals the applied input signal raised to a desired power. Devices 44 and 60 always operate at a common power. The output signal of device 60 is conducted to the output terminal 62 of computing element 22. It will be seen that this circuitry generates an output signal corresponding to that required in the denominator of the expression (9) above. In operation of computing element 22, the quantity $Y_a - u$ is computed and raised to the $k$th power.

The signals appearing at terminals 48 and 62 of computing elements 20 and 22 are conducted over lines 64 and 66 to the input terminals 68 and 70 respectively of computing element 24. This element includes a division circuit 72 which is adapted to compute the ratio of the signal applied to terminal 68 to the signal applied to terminal 70. Circuit 72 may be a conventional division servomechanism or standard electronic divider. The ratio signal produced is conducted to output terminal 74 of computing element 24 whence it is led over line 76 to probability computer output terminal 16.

By reference to expression (9) above, it will be seen that computing element 24 operates to perform the required division of the quantities constituting the numerator and denominator in the expression, said quantities being previously computed by elements 20 and 22.

Where a desired probability computation involves a request only for the bound to the probability of a random variable equaling or exceeding a deviation level greater than the expectation of the variable, the computer described to this point is operative to meet the request. The $k$th power devices 44 and 60 are manually set to any desired power e.g. 2nd, 3rd, etc.)

and the corresponding unilateral moment ($M_2a, M_3a$, etc. is employed to provide probability information at terminal 16.

In probability computation, the most useful moment is that yielding the tightest (lowest) probability bound. Depending upon the nature of the variable under study, a given moment may or may not be useful. Thus one cannot specify that probability computation based on the same variable should be made consistently using a particular moment. In operation of the computer just described, it may be preferred to perform a plurality of probability computations, each with a distinct moment and then to select from the results the tightest probability bound.

Figure 3:
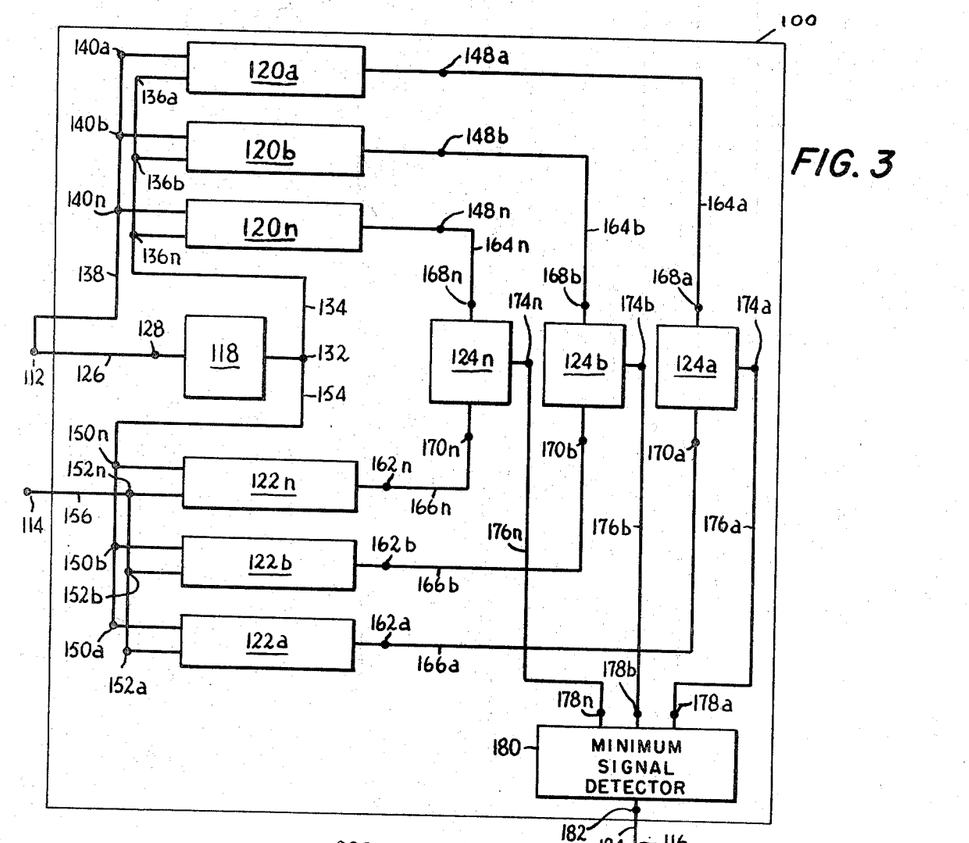
FIG. 3 is a block diagram of a modified version of the computer of FIG. 1 adapted to concurrently determine a plurality of probability bounds based on different unilateral moments and to identify the lowest of the bounds.

In the computer of FIG. 3, this manual operation for determination of lowest probability is automated. The computer 100 operates in response to input signals at terminal 112 representing the variable and at terminal 114 representing the prescribed upper limit to yield at output terminal 116 an output signal indicative of the lowest of the plurality of probability determinations.

In computer 100 computing element 118 is employed to determine the expectation of the variable under study. To this effect the variable signal is coupled from terminal 112 over line 126 to input terminal 128 of element 118. The expectation signal is generated at output terminal 132 and led over line 134 to the input terminals 136a, 136b and 136n of computing elements 120a, 120b and 120n. The variable signal is also led from terminal 112 over line 138 to the input terminals 140a, 140b and 140n of elements 120a, 120b and 120n. These computing elements are different embodiments of computing element 20 of FIG. 2 each adapted to compute a particular unilateral moment. In element 120a, $k$th power device 44 would be a first power device and is thus unnecessary. The element yields at output terminal 148a the first unilateral moment of the variable above its expectation. In the $k$th power units of elements 120b and 120n, $k$ is assigned the values of 2 and $n$ respectively, and the elements accordingly generate the second and $n$th unilateral moments at terminals 148b and 148n.

The signals representing the several unilateral moments of the variable are conducted over lines 164a, 164b and 164n to the input terminals 168a, 168b and 168n of computing elements 124a, 124b and 124n. The numerators required by expression (9) for $k = 1$, 2 and $n$ are thus provided to elements 124a, 124b and 124n.

In providing the corresponding denominators of expression (9) in computer 100, the expectation signal is conducted from terminal 132 over line 154 to the input terminals 150a, 150b and 150n of computing elements 122a, 122b and 122n. The limit value signal is coupled over line 156 to the input terminals 152a, 152b and 152n. The computing elements are different embodiments of computing element 22 of FIG. 2 each adapted to compute a particular denominator. In element 122a, $k$the power device 60 is again a first power device and is omitted. The element yields at output terminal 162a a signal representing the expression $Y_a-u$. In the $k$th power units of elements 122b and 122n, $k$ is assigned the values of 2 and $n$ respectively, the elements generating correspondingly powered $Y_a-u$ signals at output terminals 162b and 162n.

The several denominator signals are conducted over lines 166a, 166b and 166n to the input terminals 170a, 170b and 170n of computing elements 124a, 124b and 124n. These computing units are of like structure as computing element 24 of FIG. 2, and are effective to provide the ratio of signals applied thereto.

Computing element 124a provides at output terminal 174a a signal resulting from the division of the signal at terminal 168a by the signal at terminal 174a. This signal is the solution of expression (9) for $k$ equal to 1, and it thus represents a bound to the probability of the variable equaling or exceeding the limit value $Y_a$ based on the first unilateral moment of the variable above its expectation. Signals representing the same probability bound based on the second and $n$th unilateral moments are similarly provided at terminals 174b and 174n.

The signals indicative of the plurality of probability bound determinations are conducted over lines 176a, 176b and 176n to the input terminals 178a, 178b and 178n of minimum signal detector 180. This unit, which may be a diode gating circuit, is adapted to provide continuity between the input terminal thereof having the lowest applied signal and its output terminal 182. If, for example, the probability bound signals are 0.15, 0.78 and 0.8 at terminals 178a, 178b and 178n, unit 180 will conduct the first unilateral moment probability determination, 0.15, to terminal 182. Line 184 interconnects this terminal and the computer output terminal 116.

It will be seen from the above that computer 100 is operative to simultaneously produce the several unilateral moments of the variable and to determine the lowest of the probability bounds based thereon.

Figure 4:
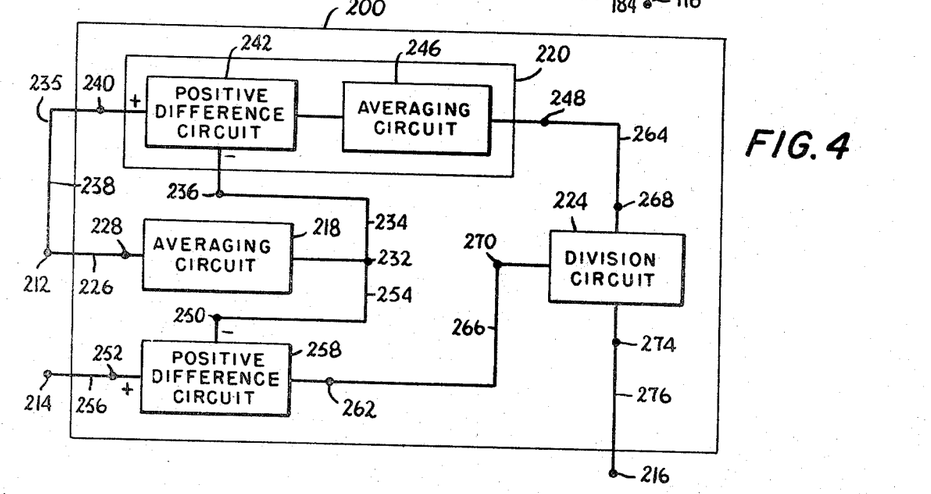
FIG. 4 is a block diagram of a modified version of the computer of FIG. 1 adapted to indicate a bound to the probability of a random variable equaling or exceeding an upper limit value based on the first moment above its expectation.

A further version of the computer of the invention is illustrated in FIG. 4 wherein computer 200 is adapted to determine the probability of a given variable equaling or exceeding a prescribed limit value based on the first unilateral moment of the variable above its expectation. The variable and the limit value signals are applied to input terminals 212 and 214 and the probability determination is made available at computer output terminal 216. Averaging circuit 218 receives the variable signal over conductor 226 which interconnects averaging circuit input terminal 228 and computer terminal 212. As in the case of the previous like circuits 18 and 118, circuit 218 provides at output terminal 232 a signal representing the expectation of the variable. The first unilateral moment of the variable above its expectation is computed in element 220 which receives the expectation signal over line 234 at input terminal 236 and the variable signal at input terminal 240 over line 238. The signals are applied to positive difference circuit 242 which is operative to subtract the expectation from the variable and to yield output signals representing only instantaneous departures of the random variable above the expectation. The output of the positive difference circuit 242 is applied to averaging circuit 246 which yields an output signal representing the average value of the difference signals over a selected period of time. These averaged signals are fed to output terminal 248 of element 220. It should be noted that element 220 does not require a $k$th power device, since in this case $k$ is equal to unity and the first unilateral moment is computed.

The expectation signal is also conducted from terminal 232 to terminal 250 over line 254. The limit value signal is likewise conducted over line 256 to terminal 252, terminals 250 and 252 being the input terminals of positive difference circuit 258. This circuit is operative to subtract the expectation from the limit value to yield output signals representing only instantaneous positive differences between the limit value and the expectation. This signal constitutes the denominator in expression (9) above for the case of $k$ equal to unity and again, a $k$th power device is unnecessary. The difference signals are made available at output terminal 262 of device 258.

The signals at terminals 248 and 262 are conducted over lines 264 and 266 to the input terminals 268 and 270 of division circuit 224. This circuit is adapted to compute the ratio of the signal at terminal 268 to the signal at terminal 270 as required to provide the probability determination based on the first unilateral moment of the variable above its expectation in expression (9). This ratio signal is generated at output terminal 274 of device 224 and is conducted over line 276 to the output terminal 216 of computer 200.

Figure 5:
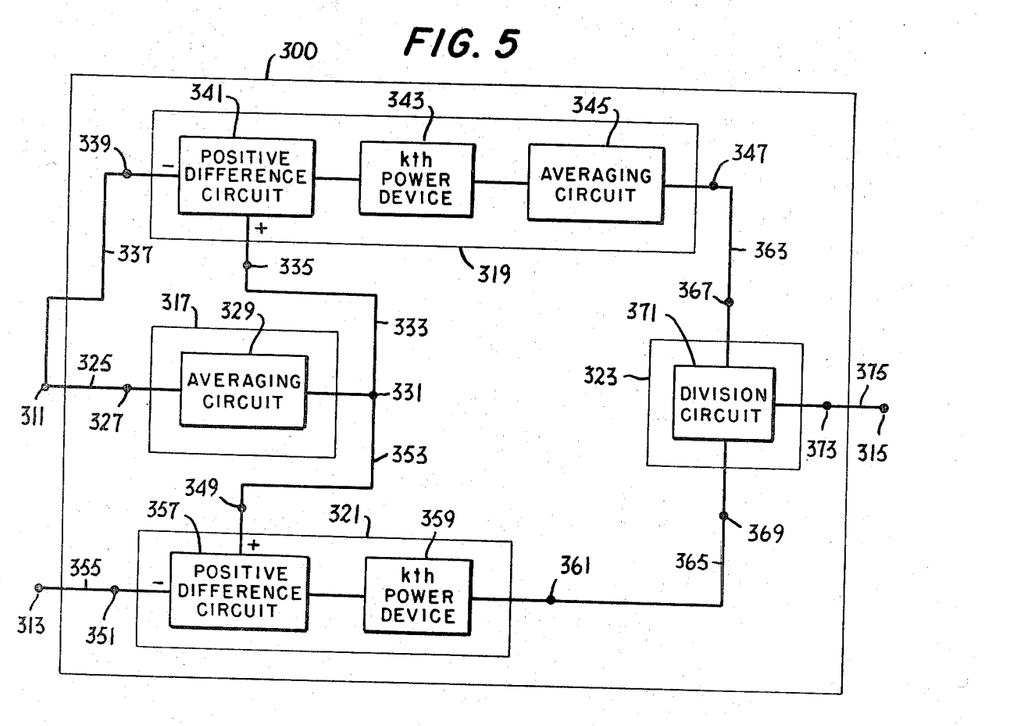
FIG. 5 is a block diagram of a modified version of the computer of FIG. 1 adapted to further provide a bound to the probability of a random variable equaling or falling below a lower limit value based on a selected unilateral moment of the variable below its expectation.

The method of probability determination in expression (10) above is implemented in the computer 300 shown in FIG. 5. This computer is adapted to provide the probability determination $P_b$, based on computation of unilateral moments below the expectation of a random variable. At input terminals 311 and 313 the computer receives input signals representing respectively the random variable X, which it is desired to maintain above a prescribed limit, and the prescribed limit $Y_b$. At output terminal 315 the computer provides the signal representing $P_b$.

The computer is functionally divisible into several separate computing elements. Element 317 is adapted to determine the expectation $u$ of the random variable X. Computing element 319 is adapted to determine from the random variable and the expectation the unilateral moments $M_k b$, of the variable below the expectation. Element 321 is adapted to compute the denominator in the probability expression (10). Element 323 is adapted to compute $P_b$ based upon input information from elements 319 and 321. It will be evident presently that the function and interconnection of these various computing elements meets that requires in expression (10).

The random variable signal $x$ is conducted from terminal 311 over line 325 to input terminal 327 of computing element 317. The signal is applied to averaging circuit 329 of element 317, the averaging circuit performing a summation of the applied signal over a given time period to provide an output signal representing the expectation of the applied signal. The expectation signal is coupled to output terminal 331 of element 317 and from this point over line 333 to input terminal 335 of computing element 319. The random variable signal is also conducted from terminal 311 over line 337 to input terminal 339 of computing element 319. These signals representing the variable and its mean are applied to positive difference circuit 341. It will be noted that the connection of terminals 335 and 339 to the plus (+) and minus (−) terminals of the positive difference circuit 341 is reversed from the manner of connection employed in circuits 42 and 242 of computers 10 and 200. Thus, circuit 341 is operative to subtract the variable from the expectation and to yield output signals representing only instantaneous departures of the random variable below the expectation. These positive difference signals are conducted to $k$th power device 343 where they are raised to a power as required by the moment under consideration. As discussed previously, if it is desired to employ only the second power, the $k$th power device 343 is a simple squaring circuit.

The output of device 343 is averaged in averaging circuit 345 and the output of this circuit is conducted to output terminal 347 of element 319.

The unilateral moments $M_k b$ of the variable below the expectation are defined as follows:

$$M_k b = \int_u^{-\infty} (u-x)^k f_x(x) dx \qquad (11)$$

where $f_k(x)$ is the probability density function of the random variable $X$ and $k$ is a positive real number.

In the computer described to this point, it will be evident that elements 317 and 319 cooperate to provide at terminal 347 the unilateral moments $M_k b$ required in expression (11).

Computing element 321 has input terminals 349 and 351 to which are applied respectively the expectation $u$ over line 353 and the limit value signal $Y_b$ over line 355. These signals are applied to positive difference circuit 357 in a manner reversed from that used in circuits 58 and 258 of computers 10 and 200. Thus, circuit 357 is operative to subtract the limit value from the expectation to yield output signals representing only instantaneous positive differences between the expectation and the limit value. These positive difference signals are conducted to $k$th power device 359, which yields as its output signals the applied input signals raised to a specific desired power. The output signal of device 359 is conducted to output terminal 361 of computing element 321. It will be seen that this circuitry generates an output signal corresponding to that required in the denominator of the expression (10) above. In operation of computing element 321, the quantity $u - Y_b$ is computed and raised to the $k$the power.

The signals appearing at terminals 347 and 361 of computing elements 319 and 321 are conducted over lines 363 and 365 to the input terminals 367 and 369 of computing element 323. The element includes a division circuit 371 which is adapted to compute the ratio of the signal applied to terminal 367 to the signal applied to terminal 369. The ratio signal produced is conducted to output terminal 373 of element 323 whence it is led over line 375 to probability computer 300 output terminal 315.

By reference to expression (10) above, it will be seen that computing element 323 operates to perform the required division of the quantities constituting the numerator and denominator in the expression, said quantities being previously computed by elements 319 and 321.

The similarities between computer 10 of FIG. 2 and computer 300 of FIG. 5 may be seen from a comparison of the two circuit diagrams. Computer 10 is operative to compute the unilateral moments of a variable above its expectation to compute the probability of the random variable remaining below a prescribed upper limit value whereas computer 300 is operative to compute the unilateral moments of the variable below its expectation to compute the probability of the variable remaining above a prescribed lower limit value.

Where it is desired to provide both limitations on the random variable simultaneously, the computers 10 and 300 may operate concurrently. In this case, terminals 12 and 311 are merely connected by a suitable interconnecting line. The composite computer thus has three input terminals 12, 14 and 313 to which are applied respectively the variable, the upper limit value and the lower limit value. The composite computer has output terminals 16 and 315 at which are made available the probability determinations $P_a$ and $P_b$ respectively. A further simplification may be employed in that elements 18 and 317 perform identical tasks, namely the computation of the expectation of the variable. Thus, items 325, 327 and 317 may be eliminated from computer 300 in the composite computer and terminals 32 and 331 may be interconnected by a suitable interconnecting line.

The circuitry of FIG. 5 is illustrative of the means by which each of the computers of FIG. 2, FIG. 3 and FIG. 4 may provide both output probability determinations $P_a$ and $P_b$. The modifications required in the computers of FIG. 3 and FIG. 4 to form composite computers such as that described in combining the computers of FIG. 2 and FIG. 5 will be evident to one skilled in the art based upon the illustrated example.

The probability computer of the invention is particularly useful in certain monitoring and control applications, such as air pollution monitoring control and manufacturing process control. In these applications, a variable such a smog or manufactured article length, mass, etc., is constantly monitored and compared with a fixed limit value identifying the allowable smog level or article characteristic level. The incorporation of the probability computer into such direct observation systems permits the additional advantage of evaluating the variable not only based upon its instantaneous value but further upon its likelihood of exceeding a limit value. Thus, anticipatory measures are provided which would permit, in the case of atmospheric pollution control, such measures as traffic diversion, or in the case of process control, the alteration of manufacturing parameters to permit continuous production. With this additional control measure, instantaneous departures above the predetermined limit values may be allowable if in the light of the probability computer analysis they are transient in nature and do not indicate a high likelihood of continuance.

Figure 6:
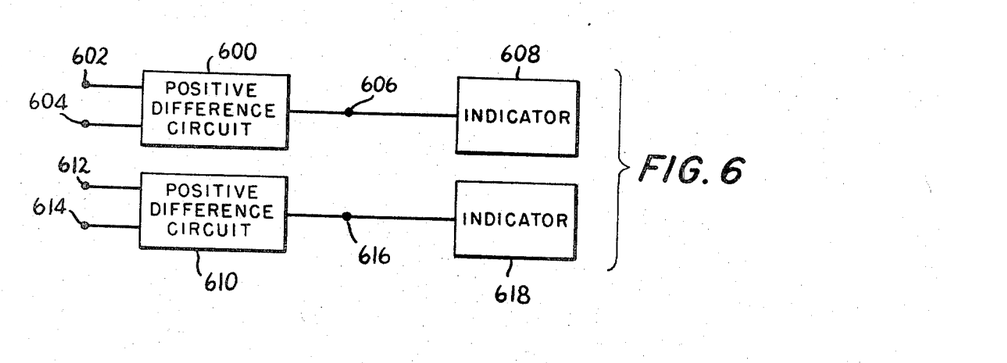
In FIG. 6, there is shown circuitry adapted to cooperate with the probability computer of the invention to permit use of the computer as a control device.

The circuitry of FIG. 6 will indicate further the nature of air pollution or precess control by the use of the probability computer. In FIG. 6 there is shown a positive difference circuit 600 having input terminals 602 and 604 and an output terminal 606. A signal indicative of permissible probability of smog level equaling or exceeding a given value or of article length, mass, etc. equaling or exceeding a given value is applied to terminal 602. The bounds to the probability of the variable equaling or exceeding the prescribed limit levels, said signal being computed by one of the computers of FIGS. 2 through 4, is applied to terminal 604. Circuit 600 is operative to subtract the signal at terminal 604 from the signal at terminal 602 and to yield as an output signal at terminal 606 the instantaneous difference between allowed and computed probability bounds. This signal is applied to an indicator 608 or may be directly utilizable in a feedback control loop in the manufacturing system. Indicator 608 may be a graduated scale indicator or an on-off indicator and serves to inform an observer of the approach of actual conditions to an undesirable level. As the undesirable point is reached, the operator may take suitable diversionary action to maintain a difference between the applied signals.

In certain cases it is desirable to employ both the additional measure of control provided by the probability computer as well as direct variable observation as is customarily employed. Thus, there is illustrated in FIG. 6 a second circuit comprising a positive difference circuit 610 having input terminals 612 and 614 and an output terminal 616 connected to an indicator 618. The random variable is applied to terminal 612 and a signal representing the limit value is applied to terminal 614, these signals being likewise applied to the computer input terminals, e.g. 12 and 14. The difference circuit provides as its output signal a signal representing the instantaneous differences between the variable and the limit value. These signals are conducted to indicator 618 where a ready observation may be made of the progress of the variable in relation to its limit value. An operator may observe indicator 618 in conjunction with indicator 608 to implement traffic diversion or process control. For example, if he notes an indicator 618 that the variable has exceeded its prescribed limit value, he may, prior to any immediate action, consult indicator 608 to determine the present difference between the allowable probability and the probability determined by the associated computer. Where indicator 608 informs him that the determined probability is significantly below the allowed probability, the operator may ignore the indication of meter 618 as embodying only a transient departure of the parameter of interest beyond its prescribed limit.

The following is an example of the use of the probability computer in manufacturing process control. In this regard, consider an automated manufacturing process in which it is desired to accommodate maximum volume output while at the same time to produce articles within particular manufacturing tolerances. Frequently, in manufacturing processes, tolerance control of this type is in direct opposition to increased speed of operation. If article length is to be maintained within particular tolerances and the article stock is fed continuously to cutting apparatus, the ability of the apparatus to maintain article length within the tolerance may be related to the speed of article stock feeding. For expeditious manufacture, an evaluation is necessary wherein the probability of article length exceeding or equaling the required tolerance level is continually determined and wherein adjustments to article feeding speed are based not only on instantaneous indications of article length but also on the probability evaluation.

In these applications of the present probability computer, the operation may take place either on an online basis, i.e. where the variable is applied directly to the computer for real-time analysis of the variable to determine probability bounds, or on an offline basis. In the latter case, information concerning the variable may be accumulated over a period of time and stored for subsequent application to the probability computer.

Other suitable applications of the present probability computer are the monitoring of current and load conditions in electrical power distribution, the monitoring of pressure in fluid distribution systems, and the monitoring and control of heating and air conditioning systems. Temperature control in chemical processes where higher yield is achievable at higher temperatures is a further area in which the probability computer of the invention may be employed to provide the additional advantage and benefit of probability control as incorporated in the present invention.

It will be evident that various changes may be made in the disclosed embodiments of the probability computer without departing from the spirit and scope of the present invention. For instance, servomechanisms or like electromechanical means may be employed throughout where the application to which the computer is directed lends itself to such embodiment. In this connection it should be noted particularly that the term circuit is intended to describe purely electronic as well as partly electrical devices.

I claim:

1. A computer for determining a bound to the probability of a variable equaling or exceeding a predetermined limit value based on a selected unilateral moment of said variable above its average value, said computer having a first input terminal for receiving a signal representing said variable, a second input terminal for receiving a signal representing said limit value and an output terminal for providing a signal representing said probability bound determination, said computer comprising:
   a. an averaging circuit for generating a signal representing said variable average value having an input terminal connected to said computer first input terminal, and having an output terminal;
   b. unilateral moment determining means having first and second input terminals connected respectively to said computer first input terminal and said averaging circuit output terminal, and having an output terminal;
   c. difference circuit means for detecting the positive difference between said limit value signal and said variable average value signal, having first and second input terminals connected respectively to said signal averaging circuit output terminal and said computer second input terminal, and having an output terminal; and
   d. division circuit means for producing a signal indicative of the ratio of the determined selected unilateral moment to said detected positive difference raised to a numerical power corresponding to said selected unilateral moment, having first and second input terminals connected respectively to said unilateral moment determining means output terminal and said difference circuit means output terminal, and having an output terminal connected to said computer output terminal.

2. The computer claimed in claim 1 wherein said unilateral moment determining means comprises first means connected to said moment determining means input terminals and receiving said variable average value signal and said variable signal therefrom for producing an output signal indicative of the disparity between said signals only when said variable signal exceeds said variable average value signal, second means connected to said first means for raising said first means output signal to a numerical power corresponding to said selected unilateral moment and third means connected to said second means for averaging said raised signal, said third means conducting said averaged raised signal to said moment determining means output terminal.

3. A computer for determining a bound to the probability of a variable, equaling or exceeding a predetermined limit value based on a selected unilateral moment of said variable above its average value, said computer having a first input terminal for receiving a signal representing said variable, a second input terminal for receiving a signal representing said limit value and an output terminal for providing a signal representing said probability bound determination, said computer comprising:
   a. an averaging circuit for generating a signal representing said variable average value, having an input terminal, and having an output terminal;
   b. unilateral moment determining means having first and second input terminals connected respectively to said computer first input terminal and said averaging circuit output terminal, and having an output terminal;
   c. difference circuit means for detecting the positive difference between said limit value signal and said variable average value signal and for raising said difference to a numerical power corresponding to said selected unilateral moment, having first and second input terminals connected respectively to said signal averaging circuit output terminal and said computer second input terminal, and having an output terminal; and d. division circuit means for producing a signal indicative of the ratio of the determined selected unilateral moments to said raised detected positive difference, having first and second input terminals connected respectively to said unilateral moment determining means output terminal and said difference circuit means output terminal and having an output terminal connected to said computer output terminal.

4. The computer claimed in claim 3 wherein said unilateral moment determining means comprises first means connected to said moment determining means input terminals and receiving said variable average value signal and said variable signal therefrom for producing an output signal indicative of the disparity between said signals only when said variable signal exceeds said variable average value signal, second means connected to said first means for raising said first means output signal to a numerical power corresponding to said selected unilateral moment and third means connected to said second means for averaging said raised signal, said third means conducting said averaged raised signal to said moment determining means output terminal.

5. A computer for simultaneously determining a plurality of bounds to the probabilities of a variable equaling or exceeding a predetermined limit value, each probability bound determination being based on a distinct unilateral moment of the variable above its average value, said computer having a first input terminal for receiving a signal representing said variable, a second input terminal for receiving a signal representing said limit value and a plurality of output terminals for providing signals representing said probability bound determinations, said computer comprising:
   a. an averaging circuit for generating a signal representing said variable average value, having an input terminal connected to said computer first input terminal, and having an output terminal;
   b. unilateral moment determining means having first and second input terminals connected respectively to said computer first input terminal and said signal averaging circuit output terminal, and having a plurality of output terminals each providing a distinct unilateral moment of said variable above said average value;
   c. difference circuit means for detecting the positive difference between said limit value signal and said variable average value signal and for raising said difference to numerical powers corresponding to said distinct unilateral moments, having first and second input terminals connected respectively to said signal averaging circuit output terminal and said computer second input terminal and a plurality of output terminals each providing one of said raised differences, and;
   d. a plurality of division circuit means, each having first and second input terminals connected respectively to one of said unilateral moment determining means output terminals and the corresponding one of said difference circuit means output terminals for producing output signals indicative of the ratios of determined unilateral moments to raised detected positive differences, each said division circuit having an output terminal providing one said ratio signal, each said division circuit output terminal being connected to one of said computer output terminals.

6. In combination, the computer claimed in claim 5 and minimum signal detection means having an output terminal and a plurality of input terminals, each input terminal connected to one of said computer output terminals, said detection means providing continuity between the output terminal thereof and the one of said input terminals thereof having the lowest value probability determination applied thereto.

7. A computer for determining a bound to the probability of a variable equaling or exceeding a predetermined limit value based on the first unilateral moment of the variable above its average value, said computer having a first input terminal for receiving a signal representing said variable, a second input terminal for receiving a signal representing said limit value and an output terminal for providing a signal representing said probability bound determination, said computer comprising:

a. a first averaging circuit for generating a signal representing said variable average value, having an input terminal connected to said computer first input terminal, and having an output terminal;
b. a first difference circuit having first and second input terminals connected respectively to said computer first input terminal and said signal averaging circuit output terminal, and having an output terminal providing a signal indicative of the disparity between said variable signal and said variable average value signal when said variable signal exceeds said variable average value signal;
c. a second difference circuit having first and second input terminals connected respectively to said computer second input terminal and said signal averaging circuit output terminal and having an output terminal providing a signal indicative of the disparity between said limit value signal and said variable average value signal when said limit value signal exceeds said variable average value signal;
d. a second averaging circuit having an input terminal connected to said computer first difference circuit output terminal, and having an output terminal; and
e. a division circuit having first and second input terminals connected respectively to said second signal averaging circuit output terminal and said second difference circuit output terminal, and having an output terminal providing a signal indicative of the ratio of said second signal averaging circuit output signal to said second difference circuit output signal, said division circuit output terminal being connected to said computer output terminal.

8. A system for determining a bound to the probability of a variable equaling or exceeding a prescribed limit value based on a selected unilateral moment of the variable above its average value and for generating a control signal indicative of the difference between said probability determination and a predetermined allowable probability of the variable equaling or exceeding the prescribed limit value, comprising in combination, the computer claimed in claim 3, and a system difference circuit having a first input terminal connected to said computer output terminal and a second input terminal receiving a signal representing said predetermined allowable probability, said difference circuit having an output terminal providing said control signal.

9. The system claimed in claim 8 including further an indicator operatively connected to said system difference circuit output terminal, said indicator adapted to display the difference between said determined and allowable probabilities.

10. The system claimed in claim 9 including further means for concurrently indicating the difference between said variable and said limit value, said means comprising a second system difference circuit having first and second input terminals connected respectively to said computer first and second input terminals and having an output terminal, and second indicator means connected to said second difference circuit output terminal, said second indicator adapted to display the difference between said variable and said limit value.

11. A computer for determining bounds to the probabilities of a variable equaling or exceeding an upper limit value or equaling and falling below a lower limit value based on selected unilateral moments of the variable above and below its average value, having a first input terminal for receiving a signal representing said variable, a second input terminal for receiving a signal representing said upper limit value, a third input terminal for receiving a signal representing said lower limit value, and first and second output terminals for providing signals representing said respective probabilities, said computer comprising:
   a. an averaging circuit for generating a signal representing said variable average value, having an input terminal connected to said computer first input terminal, and having an output terminal;
   b. first unilateral moment determining means for computing said selected unilateral moment of the variable above said variable average value, having first and second input terminals connected respectively to said computer first input terminal and said averaging circuit output terminal, and having an output terminal;

c. first difference circuit means for detecting the positive difference between said upper limit value signal and said variable average value signal, and for raising said difference to a numerical power corresponding to said selected unilateral moment, having first and second input terminals connected respectively to said computer second input terminal and said signal averaging circuit output terminal, and having an output terminal;

d. first division circuit means having first and second input terminals connected respectively to said first unilateral moment determining means output terminal and said first difference circuit output terminal for producing a signal indicative of the ratio of said determined unilateral moment above said variable average value to said raised detected positive difference, and having an output terminal connected to said computer first output terminal;

e. second unilateral moment determining means for computing said selected unilateral moment of the variable below said variable average value, having first and second input terminals connected respectively to said first computer input terminal and said averaging circuit output terminal, and having an output terminal;

f. second difference circuit means for detecting the positive difference between said variable average value and said lower limit value signal and for raising said difference to a numerical power corresponding to said selected unilateral moment, having first and second input terminals connected respectively to said signal averaging circuit output terminal and said computer third input terminal, and having an output terminal; and g. second division circuit means having first and second input terminals connected respectively to said second unilateral moment determining means output terminal and said second difference circuit output terminal for producing a signal indicative of the ratio of said determined unilateral moment below said variable average value to said raised detected positive difference and having an output terminal connected to said computer second output terminal.

12. A computer for determining a bound to the probability of a variable, equaling or falling below a predetermined limit value based on a selected unilateral moment of said variable below its average value, said computer having a first input terminal for receiving a signal representing said variable, a second input terminal for receiving a signal representing said limit value and an output terminal for providing a signal representing said probability bound determination, said computer comprising:

a. an averaging circuit for generating a signal representing said variable average value, having an input terminal, and having an output terminal;

b. unilateral moment determining means having first and second input terminals connected respectively to said computer first input terminal and said averaging circuit output terminal, and having an output terminal;

c. difference circuit means for detecting the positive difference between said variable average value signal and said limit value signal and for raising said difference to a numerical power corresponding to said selected unilateral moment, having first and second input terminals connected respectively to said signal averaging circuit output terminal and said computer second input terminal, and having an output terminal; and d. division circuit means for producing a signal indicative of the ratio of the determined selected unilateral moments to said raised detected positive difference, having first and second input terminals connected respectively to said unilateral moment determining means output terminal and said difference circuit means output terminal and having an output terminal connected to said computer output terminal.

13. The computer claimed in claim 12 wherein said unilateral moment determining means comprises first means connected to said moment determining means input terminals and receiving said variable average value signal and said variable signal therefrom for producing an output signal indicative of the disparity between said signals only when said variable average value signal exceeds said variable signal, second means connected to said first means for raising said first means output signal to a numerical power corresponding to said selected unilateral moment and third means connected to said second means for averaging said raised signal, said third means conducting said averaged raised signal to said moment determining means output terminal.

14. A system for determining a bound to probability of a variable equaling or falling below a prescribed limit value based on a selected unilateral moment of the variable below its average value and for generating a control signal indicative of the difference between said probability determination and a predetermined allowable probability of the variable equaling or exceeding the prescribed limit value, comprising in combination, the computer claimed in claim 12 and a system difference circuit having a first input terminal connected to said computer output terminal and a second input terminal receiving a signal representing said predetermined allowable probability, said difference circuit having an output terminal providing said control signal.

FO-1050
(5/69)

UNITED STATES PATENT OFFICE
CERTIFICATE OF CORRECTION

Patent No. __3,549,877__    Dated __December 22, 1970__

Inventor(s) __David A. Goldman__

It is certified that error appears in the above-identified patent and that said Letters Patent are hereby corrected as shown below:

Col. 2, line 71, "$M_k 2$" should read --$M_k a$--.

Col. 3, line 27, " $\frac{-M_k a}{(Ya-u)^k}$ " should read -- $\frac{M_k a}{(Ya-u)^k}$ --

Col. 3, line 40, " $\frac{M_k b}{(u-Y_b)^k}$ " should read -- $\frac{M_k b}{(u-Y_b)^k}$ --

Col. 4, line 75, "power e.g." should read --power (e.g.--.

Col. 5, line 1, "etc. is" should read --etc.) is--.

Col. 5, line 54, "kthe" should read --kth--.

Col. 7, line 11, "requires" should read --required--.

Col. 7, line 45, "$f_k(x)$" should read --$f_x(x)$--.

Col. 7, line 69, "kthe" should read --kth--.

Col. 8, line 44, delete "a" (second instance).

Col. 8, line 63, "precess" should read --process--.

Col. 9, line 25, "an" should read --on--.

Signed and sealed this 11th day of May 1971.

(SEAL)
Attest:

EDWARD M. FLETCHER, JR.          WILLIAM E. SCHUYLER, JR.
Attesting Officer                Commissioner of Patents